(12) United States Patent
Song et al.

(10) Patent No.: US 10,850,164 B2
(45) Date of Patent: Dec. 1, 2020

(54) CARBON NANOTUBE GOLF BALL HAVING IMPROVED HITTING FEEL, DURABILITY, AND ANTISTATIC PROPERTY

(71) Applicant: VOLVIK INC., Chungcheongbuk-do (KR)

(72) Inventors: Chul Ho Song, Gyeonggi-do (KR); Seung Geun Park, Chungcheongbuk-do (KR); Kyung Ahn Moon, Seoul (KR)

(73) Assignee: VOLVIK INC., Chungcheongbuk-Do (KR)

( * ) Notice: Subject to any disclaimer, the term of this patent is extended or adjusted under 35 U.S.C. 154(b) by 0 days.

(21) Appl. No.: 16/248,950

(22) Filed: Jan. 16, 2019

(65) Prior Publication Data

US 2020/0129814 A1  Apr. 30, 2020

(30) Foreign Application Priority Data

Oct. 25, 2018  (KR) .......................... 10-2018-0128387

(51) Int. Cl.
| | |
|---|---|
| *A63B 37/06* | (2006.01) |
| *A63B 37/00* | (2006.01) |
| *C08L 9/00* | (2006.01) |
| *C08J 7/04* | (2020.01) |
| *A63B 102/32* | (2015.01) |

(52) U.S. Cl.
CPC ...... *A63B 37/0059* (2013.01); *A63B 37/0022* (2013.01); *A63B 37/0078* (2013.01); *C08J 7/042* (2013.01); *C08L 9/00* (2013.01); *A63B 2037/0079* (2013.01); *A63B 2102/32* (2015.10); *C08J 2309/00* (2013.01); *C08J 2475/04* (2013.01)

(58) Field of Classification Search
CPC .................... A63B 37/0051; A63B 37/0022
USPC .......................................................... 473/377
See application file for complete search history.

(56) References Cited

U.S. PATENT DOCUMENTS

| | | | | |
|---|---|---|---|---|
| 3,227,456 | A * | 1/1966 | Sonneman | A63B 37/0003 473/385 |
| 7,220,191 | B2 * | 5/2007 | Onoda | A63B 37/0003 473/351 |
| 10,052,524 | B1 * | 8/2018 | Chavan | C08K 3/041 |

(Continued)

FOREIGN PATENT DOCUMENTS

| | | |
|---|---|---|
| KR | 10-1761266 B1 | 7/2017 |
| KR | 10-2018-0080817 A | 7/2018 |

OTHER PUBLICATIONS

Office Action from corresponding Korean Patent Application No. 10-2018-0128387, dated 21 Aug. 2019.

*Primary Examiner* — Raeann Gorden
(74) *Attorney, Agent, or Firm* — Harness, Dickey & Pierce, P.L.C.

(57) ABSTRACT

Disclosed is a carbon nanotube golf ball having improved hitting feel and durability, and antistatic property comprising: a core having CNT/ionomer-dispersion; a cover formed on the core; and an antistatic finish on the top cover. Herein, CNT/ionomer-dispersions having a diameter of 10 to 3,000 μm are produced in advance using an independent process, and then applied to the present art. The top cover is provided with antistatic finish using a CNT coating solution for keeping the clean surface during the golf play.

13 Claims, 5 Drawing Sheets

(56) References Cited

U.S. PATENT DOCUMENTS

2015/0005108 A1\* 1/2015 Sullivan ............ A63B 37/0092
 473/376
2016/0250522 A1\* 9/2016 Yontz ................ A63B 37/0092
 473/376

\* cited by examiner

CARBON NANOTUBE GOLF BALL HAVING IMPROVED HITTING FEEL, DURABILITY, AND ANTISTATIC PROPERTY

CROSS REFERENCES TO RELATED APPLICATIONS

This application claims priority to Korean Patent Application No. 2018-0128387, filed in the Korean Patent Office on Oct. 15, 2018. The entire contents of which are incorporated herein by reference.

FIELD

The present invention relates to a carbon nanotube golf ball having improved hitting feel, durability, and antistatic property.

BACKGROUND

Nowadays, the technological trend of golf balls can be characterized with "soft feel but durable strength". One of the most important golf ball performances must be a carry distance, representing how far a golf ball can fly when hit.

Demands for golf balls having not only soft "hitting feel" but also guaranteeing the carry distance has been increasing.

The hitting feel of a golf ball closely relates to the compression deformation of a ball. The compression deformation refers to the extent to which a ball is deformed by the loaded force. The smaller the compression deformation, the harder a golf ball feels, and the larger the compression deformation, the softer a golf ball feels.

However, in the case of a soft feel ball, there has been a problem in the durability that able to withstand impacts from hitting. The durability can be determined from an impact resistance test of a ball. The impact resistance test measures the number of striking until a golf ball is cracked or destroyed from the repeating impact.

In regard to the durability, typically, golf balls available on the market may be of more than 70 times of impact resistance. However, especially in the case of the compression deformation larger than 0.090 inch, the impact resistance of such a soft golf ball is of only 40 to 50 times, which is far below the quality requirement, showing a problem with durability. This can be mainly attributed to the relatively low cross-linked density in the core rubber.

Recently, consumer's demand for golf balls with soft hitting feel has been on the rise. However, if such a problem of reduced durability due to the increased compression deformation is not solved, the product value will be depreciated and so consumers will not purchase anymore.

Carbon nanotube is nanoscale materials having a diameter in the range of 1-100 nm, and the length up to several tens of cm. Since the discovery in 1991, carbon nanotubes have drawn great attention due to their unique properties such a high strength and elasticity. However, as a matter of fact, carbon nanotubes are not frequently employed in the commercial products until now due to mainly the lack of efficient CNT dispersion technology.

Carbon nanotubes easily tend to be aggregated in a variety of way. Mostly, carbon nanotube aggregation occurs due to the intermolecular Van der Waals forces (~950 meV/nm). Such a strong interaction between carbon nanotubes may hinder the formation of three-dimensional networks that can improve mechanical strength and conductivity when applied to commercial products.

Therefore, such aggregation problems of CNTs should be solved prior to application, otherwise, even though carbon nanotubes are used as a reinforcement in a matrix, their unique properties will not be properly developed in the composites.

In regard to the carbon nanotube dispersion technology, there are known various kind of methods for CNT dispersion; mechanical dispersion, dispersion based on solvent and dispersion agent, dispersion based on strong acid treatment, dispersion based on surface functionalization, and dispersion based on polymer, and so on.

Among these, in the case of dispersion based on solvent and dispersion agent, the carbon nanotube structures will not be easily destroyed compared to the mechanical dispersion, but the solvent and dispersants available are very limited.

In the case of dispersion based on strong acid treatment, the stability of obtained CNT colloidal solution could be reduced, and thus, particles are precipitated as time goes.

In the case of dispersion based on the surface functionalization, due to the low solubility of carbon nanotubes, there are limitations on chemical reactions and difficulties in obtaining pure carbon nanotubes after the reaction.

In the case of dispersion based on polymers, carbon nanotubes can be wrapped with polymers to improve the dispersion, where carbon nanotubes can be either directly mixed with polymers or dispersed in the in-situ polymerization using monomers.

The method of dispersion using polymers has the advantage of being able to use polymers with functional groups that can be interacted to the surface of various carbon nanotubes, which has a wide range of applications. Especially, in the dispersion method based on polymers, the carbon nanotubes can be dispersed in a regular pattern to provide the high stability of dispersion while maintaining the physical and chemical properties of carbon nanotubes.

According to the recent studies, the polymers used in dispersion of carbon nanotubes included epoxy, poly(p-phenylene vinylene) (PPV), poly(p-phenlyenevinylene-co-2,5-dioctoxy-m-pheny-lenevinyene) (PMPV), polymethyl methacrylate (PMMA), poly(parabanic acid) (PPA), or the like.

Korean Patent No. 10-1761266 described a composite master batch for a high-strength golf ball core and a method thereof, in which a master batch was manufactured by dispersing carbon nanotubes directly to polymer rubbers and applied to a golf ball core.

In Korean Patent No. 10-1761266, carbon nanotubes were added and mixed with rubber to manufacture carbon nanotube dispersions using a kneader or a Banbury mixer.

However, in the dispersion method of Korean Patent No. 10-1761266, carbon nanotubes can be significantly damaged during dispersion and, therefore, physical properties can be degraded. Moreover, in the production process, since a large amount of carbon nanotube powders were directly added and mixed with rubber for long time, there has been disadvantages of carbon nanotubes' scattering in the working area that threaten the health of workers.

Frequently, Golf balls could also become dirty because they are exposed to various environments during the play in a golf course. Moreover, since the ball surface is commonly coated with low conductive polymer materials, the static electricity can occur very often, especially in the dry weather condition.

Therefore, a golf ball landed on a golf course after hit can be attached with lawn grasses or any other foreign substances due to the static electricity generated from the surface, especially affecting the putting performance in green.

Carbon nanotubes are conductive materials. If the carbon nanotubes are applied to the surface of golf balls, it is possible to prevent the static electricity on the surface and suppress foreign substances from being attached.

Patent literatures and reference documents recited herein are incorporated by reference in its entirety so as to be individually and clearly specified.

[Patent Literature] Patent Literature 1: Korean Patent No. 10-1761266, "composite master batch for high-strength golf ball core and the method thereof", dated Jul. 19, 2017.

SUMMARY

In order to solve the aforementioned problems, the present invention provides the golf ball having improved "hitting feel" and impact resistance, including the core containing CNT/ionomer-dispersion, the cover layered on the core, and the antistatic finish treatment on the cover.

In regard to this invention, other purposes and technical features are more specifically presented to the detailed description of the invention below, the scope of the claim, and the drawings.

The present invention provides a golf ball having improved "hitting feel" and impact resistance, including a core containing CNT/ionomer-dispersions, a cover coated on the core, an antistatic coating layer coated on the cover.

The CNT/ionomer-dispersion can be manufactured in a particulate/or granulate having a diameter of several tens μm to 2 to 3 mm at maximum and can be easy in use to apply to the various types of matrices.

Carbon nanotube has a diameter of 10 to 30 nm and an aspect ratio of 100 to 1000. The ionomer described in the present invention can be the copolymer or composite selected from one or more groups, whose groups are consisted of a three-component ionomer resin partially neutralized with monovalent or divalent metal or a four-component ionomer resin obtained by the esterification of some of unsaturated carboxylic acids in the ternary ionomer resin.

The above core described in the present invention is manufactured with CNT/ionomer-dispersions added so that the above carbon nanotubes contain 2 to 8 parts for the matrix 100 parts by weight. The above matrix of the golf ball core contains one or more copolymers selected from a group consisting of polybutadiene rubber, neodymium butadiene rubber, solution styrene butadiene rubber, acrylic rubber, silicon rubber, fluoro rubber, high-cis polybutadiene rubber (HBR), or waste rubber, or composite material thereof.

The above antistatic coating layer described in the present invention is formed by spraying the antistatic coating solution to the surface of the golf ball. An antistatic coating solution is produced by adding carbon nanotubes of 10 to 60 parts by weight with respect to polyurethane of 100 parts by weight. Here, carbon nanotubes have a diameter of 0.8 to 3 nm and an aspect ratio of 100 to 1000.

The present invention provides the carbon nanotube golf ball having improved hitting feel, durability, and antistatic property; characterized with soft "hitting feel" and high durability, and antistatic property to keep the clean surface because carbon nanotubes are contained in both core and surface.

Importantly, this invention advantageously produces carbon nanotube-ionomer dispersions in the form of fine particulates and then blends them with matrix to produce the core, so carbon nanotubes can be much easily used and evenly dispersed, regardless of the matrix type for golf ball cores.

In addition, there is no risk of carbon nanotubes' flying and scattering away in a working area since the CNT/ionomer-dispersions are produced in advance in an independent process and then employed in the manufacture of golf balls.

Therefore, using the CNT/ionomer-dispersion according to the present invention, it is feasible not only to easily control the content of the carbon nanotubes in the golf ball core, but also obtain much easier and even dispersion of carbon nanotubes in a matrix materials.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION

Figure 1:
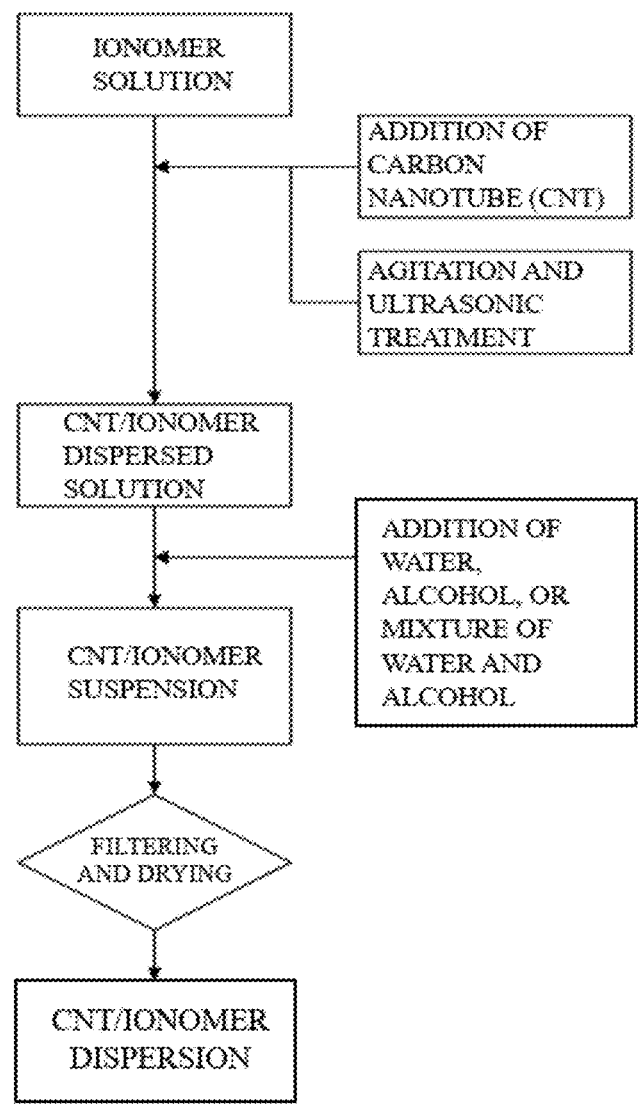
FIG. 1 illustrates a method of manufacturing a CNT/ionomer-dispersion according to an embodiment of the invention.

The present invention provides a golf ball having improved hitting feel and impact resistance, including a core containing CNT/ionomer-dispersion, a cover coated on the core, and an antistatic coating coated on the cover.

Carbon nanotubes refer to a tubular material in which hexagonal nets of carbons are connected to each other in a tubular shape. The carbon nanotube can be manufactured on the basis of chemical vapor deposition (CVD) method, arc discharge method, pulsed laser deposition (PLD) method, or the like, without limiting thereto.

The carbon nanotube can be characterized with high strength and elasticity, electric conductivity, etc. However, the carbon nanotube has been limited in its applications due to its very poor dispersion property. Prior to the wide application, the dispersion problem must be solved.

In this invention, the above carbon nanotubes are dispersed using polymers to apply to the golf ball core and the surface as well. As a result, it is able to manufacture a golf ball having soft hitting feel and excellent durability (represented by impact resistance), and also having an antistatic function on the surface.

According to this invention, carbon nanotube incorporates into the core composition of a golf ball to provide improved durability (impact resistance) while maintaining soft "hitting feel". The carbon nanotubes above are provided in the form of particulate including up to granule-like sizes.

Mostly, in the carbon nanotube golf balls mentioned in the prior art, carbon nanotubes are directly mixed and dispersed to a rubber which is one of the golf ball core matrices. In the method of the prior art, due to carbon nanotubes' breakdown in the mixing process using a kneader or a Banbury mixer, the elasticity and strength improvement effects by carbon nanotubes may be greatly reduced. In addition, there is another problem during the CNT mixing process in the prior art, carbon nanotubes may be flying and scattering around the working area, thereby causing the contamination of working environment and also harmful effects to health.

In this invention, carbon nanotubes are dispersed using ionomer polymers to produce the CNT/ionomer dispersion in advance, and then are employed to the manufacturing of a golf ball. The CNT/ionomer-dispersion may be obtained in the form of fine particulate or granule-like in which the ionomer is surrounded on the carbon nanotube surfaces. Therefore, there are no concerns about the difficult and low dispersion problem of carbon nanotubes even when the CNT/ionomer dispersions are mixed with various types of matrix materials. Accordingly, the above nanotube-ionomer dispersion can be mixed with a variety of core matrix materials and employed for the manufacturing of the golf ball core.

By using the above carbon nanotube-ionomer dispersion, golf balls with improved hitting feel and durability can be manufactured. Moreover, it is easy to use in terms of transferring and weighing, and there is no need to worry about the contamination with carbon nanotubes' scattering around the working area.

Carbon nanotubes are, in general, featured with difficult dispersion in a matrix like a rubber, and thus results in a difficult and relatively low dispersion. As in the prior art, in order to manufacture the CNT golf ball with other additive materials than rubber, a time consuming dispersion process is required until the optimal CNT dispersion.

In comparison, by using the CNT/ionomer-dispersion according to the present invention, the optimal carbon nanotube dispersion process does not really require that long time; it may be completed within several minutes. This may be one of the beneficial advantages of this invention because the carbon nanotubes are provided in the form of CNT/ionomer-dispersion particulate, which helps the CNTs more efficiently disperse into a rubber matrix. Thus, if using the CNT/ionomer-dispersion of the present invention, it is also possible to manufacture CNT golf balls using other types of rubber materials as well.

CNT/ionomer-dispersions are manufactured, according to the manufacturing method of FIG. 1.

The manufacturing method of CNT/ionomer-dispersions includes: (a) ionomer solution making process; (b) carbon nanotube-dispersed solution making process; (c) suspension making process; and (d) CNT/ionomer-dispersion producing process. The method of producing the CNT/ionomer-dispersion will now be described in details.

(a) Ionomer Solution Making Process

The ionomer solution making process is a process of dissolving the ionomer in a solvent. As a solvent for dispersing and dissolving the ionomer may be included ethers, ketones, alcohols, and the like. Among them, ethers include ethyl ether, tetrahydrofuran (THF), or the like. Ketones include acetone, methyl ethyl ketone or the like. Alcohols include ethanol, methanol, isopropanol, or the like. These solvents may be used solely or in combination of two or more. It can be more effective if applied heat while stirring for the rapid dispersion/dissolution of ionomers.

(b) Carbon Nanotube-Dispersed Solution Making Process

Carbon nanotube-dispersed solution making process is a process of making a carbon nanotube-dispersed solution by the addition of carbon nanotubes to the ionomer solution in the previous step (a).

Carbon nanotubes can be added directly in a powder form as received. More preferably, carbon nanotubes can be added to the ionomer solution prepared in the step (a) after the dispersion into the same solvent used in the step (a) above. For the more efficient dispersion of carbon nanotubes, ultrasonic application may be helpful while stirring.

In the above carbon nanotube-ionomer dispersed solution, carbon nanotubes and ionomers may be mixed at a ratio of 1:1 to 1:5 by weight. More preferably, carbon nanotubes and ionomers may be mixed at the ratio of 1:3.

If the mixing ratio is lower than "1:1", the dispersion of carbon nanotubes will not be sufficiently achieved, so the aggregation between carbon nanotubes may occur. If the mixing ratio is larger than "1:5", the excessive ionomers not interacted with carbon nanotubes exist too much, so it may degrade the matrix properties selected in the manufacturing of the golf ball core.

Carbon nanotubes in the present invention may have a diameter of 10 to 30 nm and an aspect ratio (length/diameter) of 100 to 1000. Such CNT diameters and aspect ratios above are chosen as optimized for the impact resistance and the elasticity of the CNT golf ball obtained in the present invention.

If not satisfied this condition, the dispersion property may be different; it may be difficult to insure the quality consistency of impact resistance and elasticity by carbon nanotubes. In addition, carbon nanotubes with excellent chemical stability are preferably required for CNT/ionomer-dispersions according to the present invention. More preferably, multi-walled carbon nanotubes are employed.

And then, using CNT/ionomer-dispersions prepared according to the present invention, CNT golf ball core can be manufactured through a compression molding. The compression molding can be performed at 100 to 170° C. under the pressure of ~200 tons.

Ionomers mentioned in the present invention can be copolymers or composites selected from one or more groups, whose groups are consisted of a three-component ionomer resin partially neutralized with monovalent or divalent metal or a four-component ionomer resin obtained by the esterification of some of unsaturated carboxylic acids in the ternary ionomer resin. These monovalent or divalent metals in a ternary ionomer resin system may include Na, Li, Mg, or Zn.

(c) Dispersion Solution Making Process

The dispersion solution making process is a process of manufacturing CNT/ionomer-dispersion particulates by slowly adding water, or alcohol, or the mix while rapidly agitating the carbon nanotube which already dispersed in the solution obtained in the previous process.

By adjusting the addition rate of water or alcohol, and/or the mechanical stirring rate, it is feasible to control the size of CNT/ionomer-dispersion particulates. CNT/ionomer-dispersion particulates obtained here may have a diameter of 2 to 3 mm at the maximum, more preferably, 0.05 to 1 mm (50 to 1000 μm).

(d) CNT/Ionomer-Dispersion Producing Process

The CNT/ionomer-dispersion producing process is a process of separating only CNT/ionomer-dispersion particulates by the solid-liquid separation from the dispersion solution obtained in the previous process (c).

For the solid-liquid separation, any solid-liquid separation device may be employed as long as the produced CNT/ionomer-dispersion particulates are not severely affected. The liquid phase obtained through the solid-liquid separation may be repeatedly used in the dispersion solution making process to produce more CNT/ionomer-dispersion particulates.

The resulting CNT/ionomer-dispersion particulates above may be dried with care so that they may not aggregate with each other. The drying process can be preferably performed below 40° C. in order to prevent excessive agglomeration between particulates.

In the prior art, the CNT golf ball core manufacturing can be characterized by the direct mixing of carbon nanotubes into a matrix. Accordingly, in the prior art, it looks almost impossible to obtain the uniformly controlled CNT dispersion in the matrix, and also to control the addition amount of carbon nanotubes. In the direct mixing process, unpleasantly, the working place can be contaminated with carbon nanotubes due to their flying and scattering.

In the present invention, contrary to the prior art in the above, CNT/ionomer-dispersion particulates can be in advance produced in the independent process before mixing with a matrix.

Specifically, therefore, in the present invention, carbon nanotube-ionomer dispersions can be prepared shown in FIG. 1, where carbon nanotubes are surrounded with ionomers. As a result, carbon nanotubes' mixing in a rubber matrix can be more efficiently achieved with the help of ionomers surrounded on CNT surfaces. Accordingly, carbon nanotubes can be easily dispersed regardless of the type of matrix and/or the input amount of carbon nanotubes.

In an exemplary embodiment, according to the present invention, CNT golf ball cores can be manufactured by a compression molding using a compounding stock where rubber, CNT/ionomer-dispersions, and other additive materials are mixed together under two-roll milling. Importantly, it has been confirmed that golf balls using the CNT cores according to the present invention has much more durability.

In the direct mechanical two-roll milling process in the prior art, carbon nanotubes may be significantly damaged, resulting in the length shortenings and also the generation of amorphous carbon. So it is not easy to control consistently the physical property of carbon nanotubes in a rubber matrix. Therefore, durability and elasticity improvement effect caused by CNTs will be not as much as expected.

In comparison, more importantly in the present invention, the CNT/ionomer-dispersions are prepared first in the wet dispersion method shown in FIG. 1, and then followed by the two roll milling process. Therefore, due to the rapid and effective dispersion the structures of carbon nanotubes can be highly protected from the damages.

In the present invention, the CNT core may be manufactured by the addition of CNT/ionomer-dispersions of 2 to 8 parts by weight with respect to a rubber matrix of 100 parts by weight. More specifically, if the CNT content in a core is less than 2 parts, durability and elasticity improvement effect caused by CNTs become negligible. For the CNT content over 8 parts by weight, durability and elasticity improvement effect are not very significant as well.

According to an exemplary embodiment, in the present invention, as a matrix for CNT golf ball cores, one or more can be selected from the group consisting of a polybutadiene rubber, a neodymium butadiene rubber, a styrene butadiene rubber, an acrylic rubber, a silicone rubber, a fluoro rubber, or a waste rubber, or a composite materials thereof. A polybutadiene rubber can be preferably used as a matrix for the core.

Figure 2:
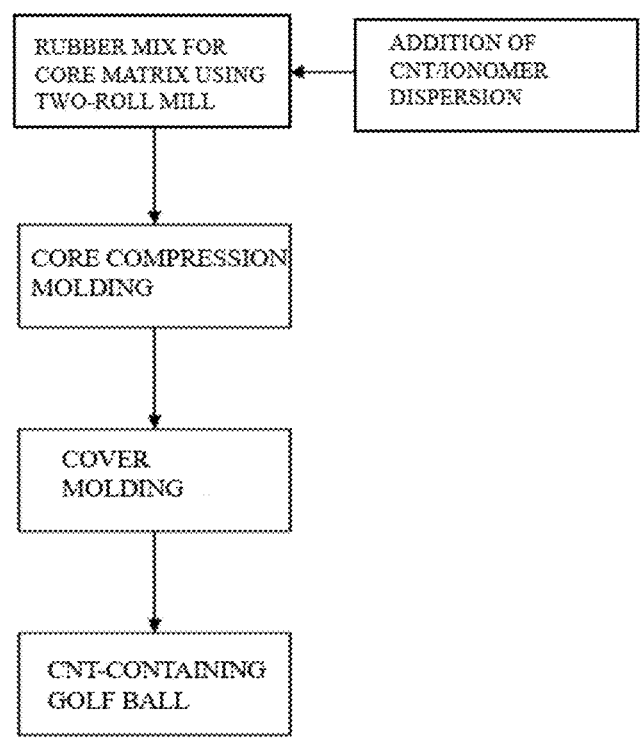
FIG. 2 illustrates a method of manufacturing a golf ball having improved hitting feel and impact resistance, containing the CNT/ionomer-dispersions according to an embodiment of the invention.
Figure 3A:
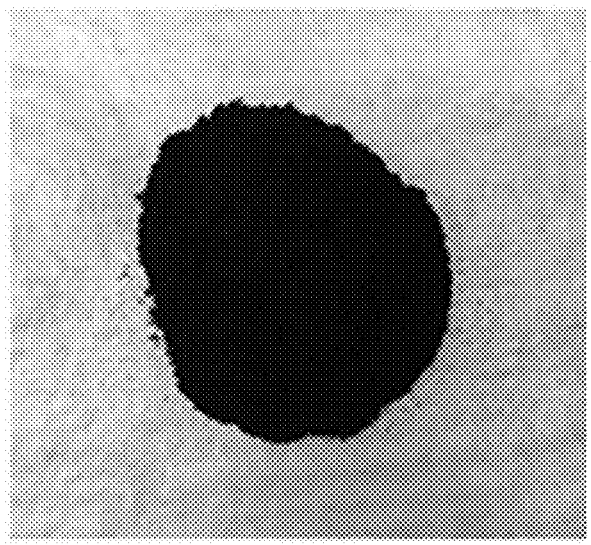
FIG. 3A illustrates carbon nanotubes used in manufacturing of a CNT/ionomer-dispersion.
Figure 3B:
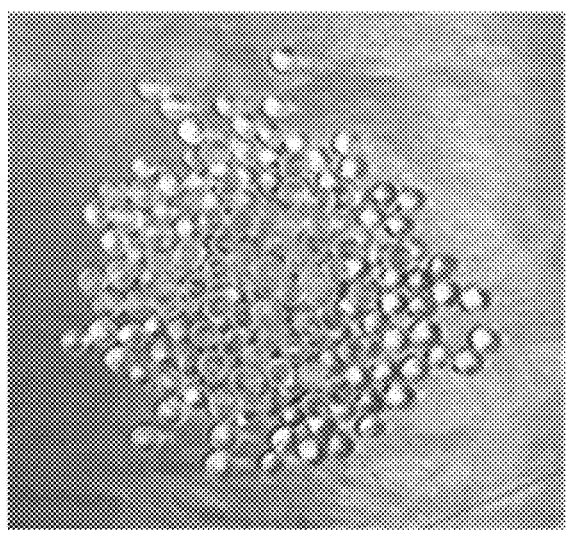
FIG. 3B illustrates ionomers used in manufacturing of a CNT/ionomer-dispersion.

FIG. 2 illustrates a method of manufacturing a golf ball having improved hitting feel and impact resistance using a core manufactured as described above.

In the present invention, the manufacturing method of CNT golf balls includes: (e) CNT core manufacturing process; (f) cover manufacturing process on the core; and (g) antistatic treatment process on the cover.

(e) CNT Core Manufacturing Process

Using CNT/ionomer-dispersions, The CNT core can be manufactured by a compression molding. The compression molding can be performed at 100 to 170° C. under the pressure of ~200 tons.

In the rubber compound for CNT cores, includes cross-linking agents, initiators, antioxidants, and inorganic fillers, and thereof. The resulting molded core may be kept over 1 day at the ambient temperature, and then followed by a centerless-grinding, and a drying process.

(f) Cover Manufacturing Process on the Core

Any polymeric materials used for the conventional golf ball cover can be employed here without limitation.

According to this invention, polymeric materials to be used for the cover may include an ionomer resin, a polyester, an ester-ether copolymer, a polyamide, a polyurethane, or a mixture of them. However, an ionomer resin or polyurethane may be preferably employed, and an ionomer cover can be manufactured by injection molding using ionomer resins.

Polyurethane mentioned above has been widely used for the golf ball cover due to various physical and mechanical properties, depending on the diol and di-isocyanate structures to be used.

Polyurethane cover can be manufactured via different ways of molding; a RIM method, a casting method, an injection method or a compression method, and thereof.

Especially, according to the present invention, the covering using a polymer having a low light transmittance is preferably achieved with a suitable thickness, in order to hide the color of inside core.

According to the present invention, the cover can be manufactured in a multilayered structure and, by adding a suitable pigment; it is more preferable that light transmittance can be lowered to hide the color of inside core.

(g) Antistatic Treatment Process on the Cover

The present invention provides a golf ball capable of minimizing static electricity by forming a conductive top coating containing carbon nanotubes. According to an exemplary embodiment, the antistatic top coating layer mainly consists of urethane (polyurethane) and carbon nanotubes. The antistatic top coating layer is formed on the cover by spraying a coating solution containing carbon nanotubes of 10 to 60 parts by weight to urethane of 100 parts by weight.

In the present invention, the carbon nanotube used in the core is multi-walled carbon nanotubes (MWCNT). However, in comparison, the carbon nanotube used for the antistatic treatment is preferably single-walled carbon nanotubes (SWCNT) that are of excellent conductivity.

According to an exemplary embodiment, if the top finish of urethane is treated with conductive carbon nanotubes, the static electricity can be significantly reduced due to the increased electric conductivity on the top finish.

For the top finish antistatic coating, carbon nanotubes in a diameter of 0.8 to 3 nm and an aspect ratio of 100 to 1000 can be preferably employed. If carbon nanotubes less than 10 parts by weight are added, the electric resistance may exceed the antistatic resistance allowance of "$10^{11}$ Ω/sq", resulting in an insignificant antistatic effect. And moreover, if carbon nanotubes more than 60 parts by weight are added, the light transmittance is reduced to lower than 90%, resulting in the quality degradation in color presentation.

According to an exemplary embodiment, in the present invention, a spray method is most preferable for the antistatic top finish treatment. On the other hand, in the case of dipping method, the coat thickness may not be consistent, depending on the location in the surface, resulting in shadow-like spots.

In particular, if the carbon nanotube content is more than 60 parts by weight in a coating solution, the viscosity becomes too high to spray. Hence, in the finish treatment the amount of carbon nanotubes to be used should be carefully handled.

By the antistatic finish treatment in the present invention, the generation of static electricity on the surface can be significantly reduced, thereby preventing the adherence of foreign substances such as dried lawn-grasses during the golf play.

The static electricity refers to electricity in which electric charges are in the stationary state, which means that the electric charge distribution does not change with time.

In general, polyurethane used for the top finish coat on the golf ball cover can be featured with high surface resistance, so that the static electricity can be easily generated during the golf play. Particular, in the case of that an impacted golf ball lands on the ground and rolls on the field, physical frictions may occur with the field and generate static electricity, thereby inducing the attachment with foreign substances as mentioned above.

The degree of static electricity can be determined by measuring the surface resistance (S2/sq). If the surface resistance is high, electric charges tend to stay in the stationary state, and thus the static electricity can be easily generated. If the surface resistance is low, electric charges tend to move freely, and thus the static electricity can be reduced. Generally, if the surface resistance is lower than $10^{11}$ Ω/sq, it is commonly considered that an antistatic effect works.

According to an exemplary embodiment, in the present invention, the antistatic treated finish coating can be formed by spraying the coating solution consisted of conductive carbon nanotubes and also polyurethane having a relatively excellent light transmittance property.

In the present invention, the antistatic treated coat may be characterized with surface resistances of $10^8$ to $10^{11}$ Ω/sq and light transmittances of 90 to 95%.

If the surface resistance is higher than $10^{11}$ Ω/sq, the antistatic effect becomes insignificant. Furthermore, even if the surface resistance is lower than $10^8$ Ω/sq, the antistatic effect is not further significantly improved.

According to the present antistatic treatment, since the antistatic coating layer may have relatively high transmittances of 90 to 95%, the golf ball color can be well presented without any problem. Here, the antistatic coating layer can be formed from the coating solution containing carbon nanotubes of 10 to 60 parts by weight with respect to polyurethane of 100 parts by weight. Preferably, the coating solution may include carbon nanotubes of 20 to 40 parts by weight with respect to polyurethane of 100 parts by weight. More preferably, the coating solution may include carbon nanotubes of 20 parts by weight with respect to polyurethane of 100 parts by weight.

If carbon nanotubes more than 60 parts by weight are used, the transmittance may be reduced to lower than 90%, thereby resulting in the distorted cover color presentation. If carbon nanotubes less than 20 parts by weight are used, the antistatic effect may be significantly reduced.

According to an exemplary embodiment, the golf ball manufactured according to the present invention can be characterized with the compression deformation of 0.050 to 0.110 inches and the coefficient of restitution (COR) of 0.78 to 0.82. Furthermore, the impact resistance can be 90 times or more, preferably 90 to 200 times.

These values mentioned above in regard to the compression deformation and COR can be similar to those of conventional golf balls manufactured from using the rubber without CNT. However, the golf balls according to the present invention can be characterized with excellent durability; for example, impact resistance of 90 to 120 times, which is much greater than that of conventional golf ball; less than 50 times.

Accordingly, the golf ball manufactured according to the present invention can be characterized with soft hitting feel and excellent durability as well. The characteristic features of the present invention will be described in more details in the following examples.

EXEMPLARY EMBODIMENTS

1. Manufacturing of CNT/Ionomer-Dispersion Particulates

A four-necked flask of 2 liters equipped with a mechanical stirrer, a condenser, and a temperature controller was prepared. The ionomer Nucrel® 2806, Surlyn® 8150, or Surlyn® 9150 of 100 g in the form of pellet was added to THF/isopropanol (80/20 volume %) of 1,000 ml, and then the mixture was mechanically stirred for 6 hours at 60° C., thus resulting in an ionomer solution.

After carbon nanotube powders (CNT) of 50 g were added to the above ionomer solution, and then water was slowly added to produce the suspension while mechanically stirred violently to evenly disperse carbon nanotubes. The ultrasonic power can also be also to aid for better dispersion.

Figure 4A:
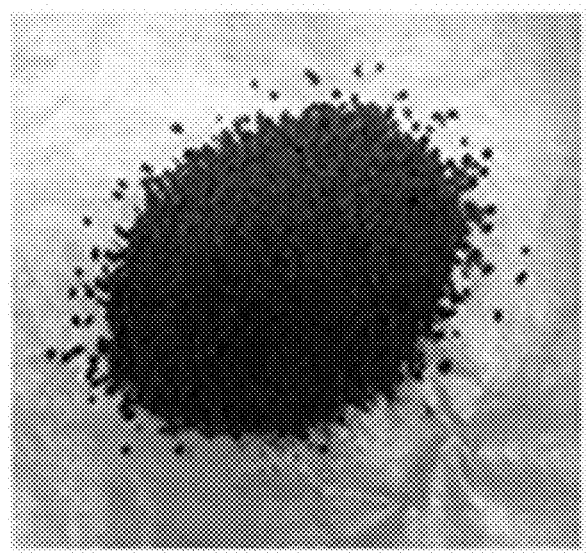
FIG. 4A illustrates the CNT/ionomer-dispersion manufactured in a particulate type according to an embodiment of the invention.
Figure 4B:
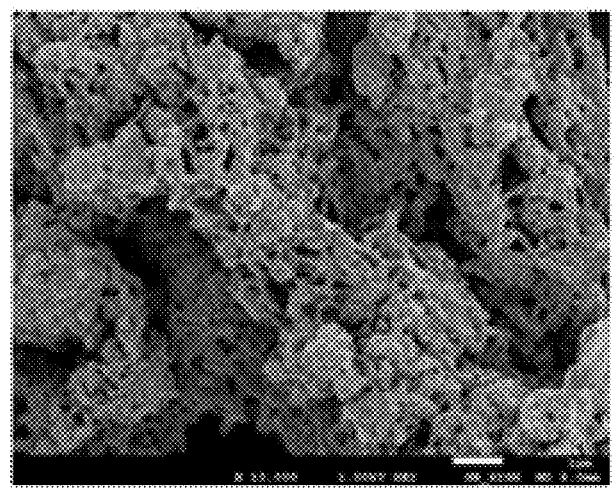
FIG. 4B illustrates the SEM image (×10,000) of CNT/ionomer-dispersion manufactured in a particulate type according to an embodiment of the invention.

Using a filtration device, the above suspension was filtered out to collect CNT/ionomer-dispersion particulates, and the resulting CNT/ionomer-dispersions were then completely dried at the room temperature. The CNT/ionomer-dispersion is shown in FIG. 4, (a) particulates and (b) enlarged SEM image (×10,000), respectively.

2. Manufacturing of Carbon Nanotube-Containing Golf Ball Core

For CNT core manufacturing, the CNT/ionomer-dispersion obtained in Example 1 was added to the NdBR rubber of 100 parts by weight such that the carbon nanotube content was 0, 2, 4, 6 and 8 parts by weight, and such other additives as antioxidant, stabilizer, inorganic filler, crosslinking agent, initiator, and the like were also added.

The following Table 1 shows Examples and Comparative Example of the CNT-containing golf ball core according to the present invention.

TABLE 1

| Golf ball | Matrix | CNT/ionomer-dispersion | |
|---|---|---|---|
| core | NdBR rubber | Ionomer | CNT |
| Comparative Example | 100 parts by weight | 0 part by weight | 0 part by weight |

TABLE 1-continued

| Golf ball core | Matrix NdBR rubber | CNT/ionomer-dispersion Ionomer | CNT |
|---|---|---|---|
| Example 1 | 100 parts by weight | 10 parts by weight | 2 parts by weight |
| Example 2 | 100 parts by weight | 20 parts by weight | 4 parts by weight |
| Example 3 | 100 parts by weight | 30 parts by weight | 6 parts by weight |
| Example 4 | 100 parts by weight | 40 parts by weight | 8 parts by weight |

Using CNT/ionomer-dispersion particulates manufactured as in the exemplary embodiment 1, as shown in Table 1, the carbon nanotube content included in the core was set to 0, 2, 4, 6, and 8 part by weight for the comparative example, Example 1, Example 2, Example 3, and Example 4, respectively.

In the comparative example in which the carbon nanotube content is set to 0 part by weight, the golf ball core was manufactured only using the NdBR rubber without adding the CNT/ionomer dispersion at all.

As shown in Table 1, each of CNT containing rubber compositions was produced by two-roll milling, and then kept over 1 day at the ambient temperature.

For the core compression molding, each of the CNT core compositions was cut into appropriate sizes, and then placed into the core compression mold. The core molding was carried out for 20 minutes at 150° C. During the core molding process, degassing was performed at least two times. The resulting molded core was cooled down to the room temperature, and then centerless-grinded and dried for the next cover manufacturing process.

3. Cover Manufacturing on the CNT Core

In this invention, the cover manufacturing was performed by the injection molding of polymeric golf ball cover materials onto the CNT cores manufactured as described in Comparative Example and Examples 1 to 4.

Figure 5:
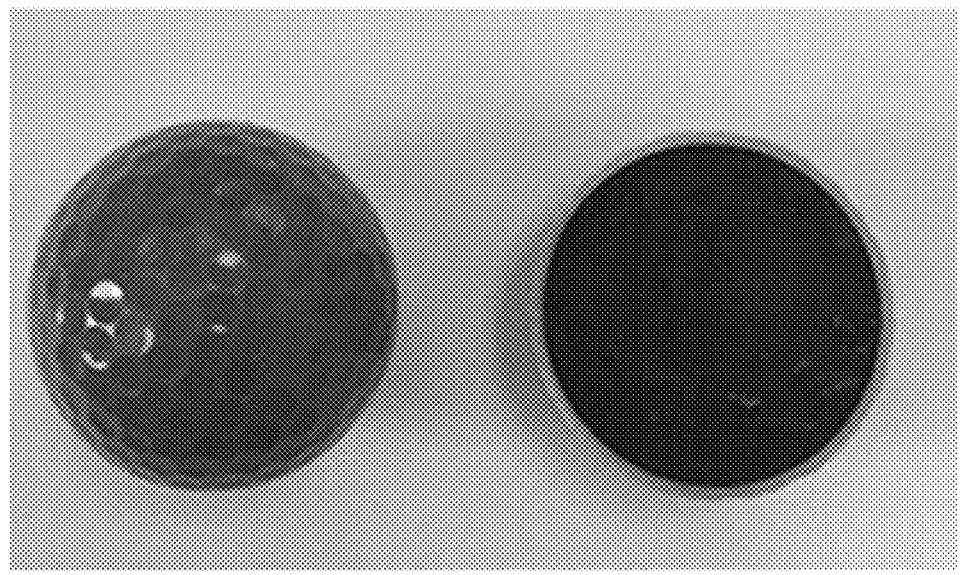
FIG. 5 illustrates a golf ball having improved hitting feel and impact resistance, containing a CNT/ionomer-dispersion according to an embodiment of the invention.
Figure 6:
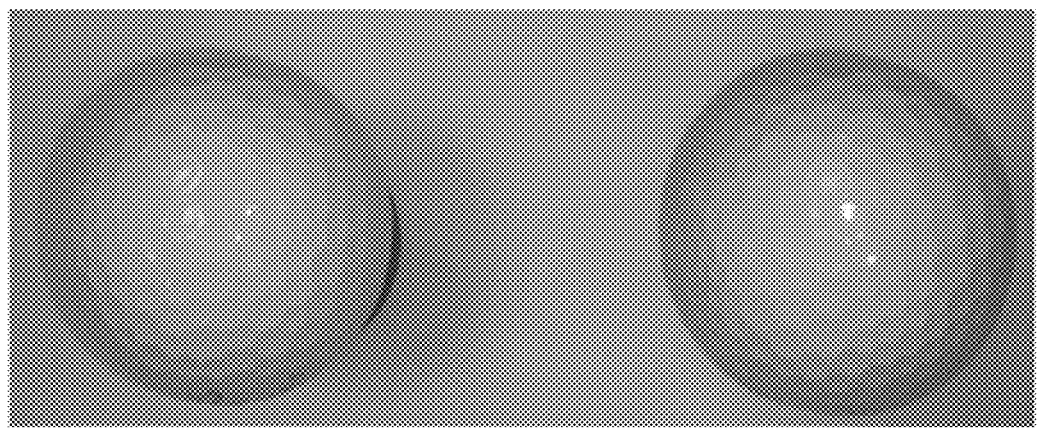
FIG. 6 illustrates a golf ball coated with an antistatic coating solution containing carbon nanotubes according to an embodiment of the invention.

The injection molding was carried out using a vertical-type injection machine ENGEL® insert 100, equipped with a hot runner type mold and a 322 dimpled cavity. As a result, the single type was formed using Surlyn® ionomers, and its cover thickness was 1.65 mm. FIG. 5 shows the CNT golf ball manufactured as described above, and its cross section.

4. Antistatic-Treated Top Finish

For the antistatic finish treatment, such coating solutions as shown in Table 2 were prepared by mixing an urethane (polyurethane) solution and single walled carbon nanotubes (SWNT). The golf ball covers were treated with the prepared antistatic coating solutions in which the SWNT content in Example 5-8 was 10, 15, 20, and 25 parts by weight with respect to urethane of 100 parts by weight, respectively.

TABLE 2

| Golf ball | Golf ball core | Antistatic coating Urethane | CNT | Coating type |
|---|---|---|---|---|
| Example 5 | Example 4 | 100 parts by weight | 10 parts by weight | Spray type |
| Example 6 | Example 4 | 100 parts by weight | 15 parts by weight | Spray type |
| Example 7 | Example 4 | 100 parts by weight | 20 parts by w eight | Spray type |
| Example 8 | Example 4 | 100 parts by weight | 25 parts by weight | Spray type |

5. Measurements of Compression Deformation, Durability, and COR

For the golf balls manufactured as in the comparative example and Examples 1 to 4, after buffing, grinding, and coating process were completed, compression deformation, durability, and COR were measured.

The compression deformation was measured using the ADC® compression tester. The durability was measured in terms of the impact resistance using the Ball Durability and COR systems, ADC corp. USA.; the ball to be tested was placed in a cannon and shot toward the thick metal plate placed in 2.54 m away. The ball was repeatedly shot at the speed of 175 ft/sec until cracked or broken. The number of repeated shot until cracked or broken was determined as the impact resistance. As the number of shot increases, the impact resistance of a ball may be considered as being higher.

The coefficient of restitution (COR) was measured, using the same test machine as in the durability test, by shooting the ball at the speed of 125 ft/sec toward the thick metal plate placed in 2.54 m away. The COR values were automatically obtained, based on the speed difference ratio ($V_{after}/V_{before}$) before and after the collision. The following Table 3 shows the results of compression deformation, impact resistance, and COR measurements.

TABLE 3

| | Golf ball core | | Measurement results | | |
|---|---|---|---|---|---|
| Golf ball | NdBR rubber | CNT | Compression deformation | Durability (Impact resistance) | COR |
| Example 9 | 100 parts by weight | 0 part by weight | 0.098 inches | 52 times | 0.815 |
| Example 10 | 100 parts by weight | 2 parts by weight | 0.098 inches | 91 times | 0.811 |
| Example 11 | 100 parts by weight | 4 parts by weight | 0.098 inches | 99 times | 0.804 |
| Example 12 | 100 parts by weight | 6 parts by weight | 0.097 inches | 103 times | 0.800 |
| Example 13 | 100 parts by weight | 8 parts by weight | 0.096 inches | 119 times | 0.796 |

Generally, it is of note that if the compression deformation is larger than 0.090, the ball can be considered "soft feel" when hit. As shown in Table 3, for the comparison purpose, "soft feel" golf balls with or/without CNT were prepared, respectively.

From the results in Table 3, it is shown that, even though the CNT content increases from 0 up to 8 parts by weight, the compression deformation is constantly maintained in the range of 0.097 to 0.098, thereby indicating the carbon nanotubes does not play an important role in "compression deformation". This can be understood from that it is generally well known that the degree of compression deformation in a golf ball is closely related to the degree of cross-linking in the rubber matrix; carbon nanotubes are not participated in the rubber cross-linking formation. Regardless of the addition amount of carbon nanotubes, the compression deformation of CNT golf balls was kept nearly constant.

Most importantly, however, by applying CNT/ionomer-dispersion particulates into golf ball cores, the durability (impact resistance) was greatly influenced by the addition of carbon nanotubes, as shown in Table 3.

In the case of Example 9 where carbon nanotubes were not added at all, the impact resistance was only 52 times, much less than the general golf ball specification (impact resistance >70 times). Herein, this result has confirmed again the fact of that golf balls with soft feel have "fatal weakness" in durability.

However, the impact resistance of CNT/ionomer-containing golf balls greatly increases as the carbon nanotube content increases. As shown in Table 3, in the case of Example 10 where carbon nanotubes are contained by 2 parts by weight, the impact resistance was found to be 91 times, thereby indicating 75% improvement compared to the control (Example 9) without carbon nanotubes. In the case of Example 11 (4 parts of carbon nanotube), the impact resistance was found to be 99 times, thereby indicating 90% improvement compared to Example 9. In the case of Example 12 (6 parts of carbon nanotube) the impact resistance was found to be 103 times, indicating 98% improvement compared to Example 9. In the case of Example 13 (8 parts of carbon nanotube), the impact resistance was found to be 119 times, thereby indicating 128% improvement in the durability.

Carbon nanotubes can be characterized with their unique mechanical properties of high mechanical strength and excellent elasticity. From the results in Table 3, as the content of carbon nanotubes increases, the impact absorption capability of the CNT golf ball is definitely improved.

According to the exemplary embodiment herein, in the present invention, it has been proved that the carbon nanotube does not contribute to the rubber cross-linking. Therefore, if only the conditions such that carbon nanotubes can be efficiently dispersed in the core are met as in the present invention, durability improvement effect due to the carbon nanotube can be obviously showed up, especially in the "soft feel" golf ball.

Hence, according to the present invention, the CNT-containing golf ball has significantly improved the durability while maintaining soft feel, compared to the regular golf ball without carbon nanotubes.

6. Measurement Result of Conductivity and Transmittance

As described in the exemplary embodiment 4, the antistatic coating solutions were prepared by mixing urethane (polyurethane) solution and carbon nanotubes (SWNT) together.

Prior to the antistatic treatment on the golf ball cover, using antistatic solutions with different CNT content, the antistatic coat layers were firstly prepared on PET films by Doctor Blade method. The surface resistance and light transmittance for these antistatic treated PET films were measured, respectively.

TABLE 4

| Antistatic coating solution | | Surface resistance | Trans- |
| --- | --- | --- | --- |
| Urethane | CNT | (ST-3) | mittance |
| 100 parts by weight | 5 parts by weight | $10^{11.5}$ Ω/sq | 98.9% |
| 100 parts by weight | 10 parts by weight | $10^{9.6}$ Ω/sq | 97.7% |
| 100 parts by weight | 15 parts by weight | $10^{9.6}$ Ω/sq | 96.5% |
| 100 parts by weight | 20 parts by weight | $10^{8.5}$ Ω/sq | 94.5% |
| 100 parts by weight | 40 parts by weight | $10^{8.3}$ Ω/sq | 92.8% |
| 100 parts by weight | 60 parts by weight | $10^{6.9}$ Ω/sq | 90.7% |
| 100 parts by weight | 80 parts by weight | $10^{6.9}$ Ω/sq | 88.7% |
| 100 parts by weight | 100 parts by weight | $10^{6.5}$ Ω/sq | 85.8% |

As shown in Table 4, as the carbon nanotube content increases, the surface resistance decreases. In the case of the carbon nanotube of 5 parts by weight of with respect to the urethane of 100 parts by weight, the surface resistance was found to be $10^{11.5}$ Ω/sq, which was short of the antistatic requirement standard. In the case of the carbon nanotube of 10 parts by weight or more, the surface resistance was found to be $10^{9.6}$ Ω/sq or lower, correspondingly.

In regard to the light transmittance, the transmittance decreases as the carbon nanotube content increases. Generally, if the transmittance of a coated film is 95% or higher, there is no problem in presenting the color as it is.

As shown in Table 4, in the case of the carbon nanotube of 15 parts by weight with respect to the urethane of 100 parts by weight, the transmittance was found to be 96.5%. In the case of the carbon nanotube of 20 parts or more by weight, the transmittance was found to be 94.5% or lower, correspondingly.

Therefore, according to the exemplary embodiment, in order to manufacture a CNT coating solution that can meet the antistatic condition (i.e., surface resistance of less than $10^{11}$ Ω/sq) upon applied, the carbon nanotube content in the solution may be more than 10 parts with respect to the urethane of 100 parts by weight. In addition, in order to manufacture a coating solution providing the color presentation without any distortion (i.e., transmittance of 95% or higher), the carbon nanotubes content may be less than 20 parts by weight with respect to the urethane of 100 parts by weight.

For the antistatic application on the golf ball cover, the golf ball cores manufactured in Example 4 were employed and the cover was injection-molded using ionomers. The CNT-containing antistatic solution verified through the PET film test above was sprayed and coated on the cover. The surface resistance and the transmittance were measured, respectively.

TABLE 5

| Golf ball | Golf ball core | Antistatic coating | | Surface resistance (Ω/sq) | Trans- mittance |
| --- | --- | --- | --- | --- | --- |
| | | Urethane | CNT | | |
| Example 14 | Example 4 | 100 parts by weight | 10 parts by weight | $1.52 \times 10^{11}$ to $3.52 \times 10^{12}$ | 97.7% |
| Example 15 | Example 4 | 100 parts by weight | 15 parts by weight | $1.58 \times 10^{10}$ to $5.17 \times 10^{11}$ | 96.5% |
| Example 16 | Example 4 | 100 parts by weight | 20 parts by weight | $3.74 \times 10^{9}$ to $2.46 \times 10^{10}$ | 94.5% |
| Example 17 | Example 4 | 100 parts by weight | 25 parts by weight | $1.15 \times 10^{9}$ to $3.89 \times 10^{9}$ | 93.0% |

As shown in Table 5, in the case of carbon nanotubes of 15 parts by weight the maximum surface resistance was higher than $10^{11}$ Ω/sq whose value was somewhat different from the PET film result. This can be attributed to the difference between the PET and the ionomer used as a substrate. The resulting CNT-containing antistatic treatment is sufficiently thin, typically ~10 μm. Accordingly, the surface resistance may be influenced by the substrate's electrical properties, depending on PET or ionomer layer. In regard to the transmittance, the transmittance at the CNT content of 15 parts by weight was 96.5%, similar to the PET film result.

Therefore, for the CNT antistatic treatment having antistatic capability, high transmittance for excellent color presentation, it is desirable to employ the antistatic solution containing the carbon nanotube content of 15 parts with respect to urethane of 100 parts by weight.

Specific embodiments described herein are representative of preferable implementations or exemplifications of the present invention, and the scope of the invention is not limited thereby. Those skilled in the art would appreciate that further modifications and applications may be possible without departing from the spirit and scope of the invention as defined in claims and their equivalents.

What is claimed is:

1. A golf ball having an improved hitting feel and durability, comprising:
a core having CNT/ionomer-dispersion;
a cover formed on the core; and
an antistatic finish on the cover,
wherein the ionomer contains one or more copolymers selected from the group consisting of a ternary ionomer resin partially neutralized with a monovalent or divalent metal, a quaternary ionomer resin obtained by esterification of a part of unsaturated carboxylic acids of the ternary ionomer resin, and a composite material thereof,
wherein the antistatic finish contains polyurethane and carbon nanotubes.

2. The golf ball according to claim 1, wherein the CNT/ionomer-dispersion is in the form of particulates having a diameter of 10 μm to 3,000 μm.

3. The golf ball according to claim 1, wherein the CNT/ionomer-dispersion contains carbon nanotubes and ionomers at a weight ratio of 1:5 to 1:1.

4. The golf ball according to claim 3, wherein the carbon nanotube has a diameter of 10 to 30 nm and an aspect ratio of 100 to 1,000.

5. The golf ball according to claim 1, wherein the core is manufactured by adding a CNT/ionomer-dispersion such that a content of the carbon nanotubes becomes 2 to 8 parts by weight with respect to a matrix of 100 parts by weight.

6. The golf ball according to claim 5, wherein the matrix of the golf ball core contains one or more copolymers selected from a group consisting of polybutadiene rubber, neodymium butadiene rubber, styrene butadiene rubber, acrylic rubber, silicon rubber, fluoro rubber, or waste rubber, or a composite material thereof.

7. The golf ball according to claim 1, wherein the antistatic finish is manufactured by adding carbon nanotubes of 10 to 60 parts by weight with respect to polyurethane of 100 parts by weight.

8. The golf ball according to claim 1, wherein the carbon nanotube has a diameter of 0.80 to 3 nm and an aspect ratio of 100 to 1,000.

9. The golf ball according to claim 1, wherein the antistatic coat layer is manufactured by producing an antistatic coat solution containing the polyurethane and the carbon nanotube, and then spraying the coat solution.

10. The golf ball according to claim 1, wherein the golf ball has a compression deformation of 0.060 to 0.110 inch.

11. The golf ball according to claim 1, wherein the golf ball has a coefficient of restitution (COR) of 0.78 to 0.82.

12. The golf ball according to claim 1, wherein the golf ball has an impact resistance of 90 times or more.

13. The golf ball according to claim 1, wherein the antistatic coat layer has a surface resistance of $10^8$ to $10^{11}$ Ω/sq and a transmittance of 90 to 99%.

* * * * *